United States Patent [19]

Tonoe et al.

[11] Patent Number: 4,805,522
[45] Date of Patent: Feb. 21, 1989

[54] CROSS MEMBER STRUCTURE FOR AUTOMOBILE

[75] Inventors: Nobuyuki Tonoe; Hirokazu Yoshikawa, both of Saitama, Japan

[73] Assignee: Honda Giken Kogyo Kabushiki Kaisha, Tokyo, Japan

[21] Appl. No.: 198,675

[22] Filed: May 25, 1988

Related U.S. Application Data

[63] Continuation of Ser. No. 867,332, May 23, 1986, abandoned.

[30] Foreign Application Priority Data

May 29, 1985 [JP] Japan ............................ 60-080777[U]
May 29, 1985 [JP] Japan ............................... 60-115700

[51] Int. Cl.$^4$ ............................................. B60H 1/10
[52] U.S. Cl. ......................................... 98/2.07; 98/2.08; 98/2.09; 98/2.16
[58] Field of Search ............... 98/2.09, 2.08.2.07, 98/2.06.2.16., 2.17.2.11, 2; 296/70; 180/90

[56] References Cited

U.S. PATENT DOCUMENTS 3,301,161  1/1967  Attwood et al. ................... 98/2.07
4,223,754  9/1980  Mizuno et al. ................... 98/2.08 X
4,559,868 12/1985  Nonaka et al. ...................... 98/2.08

FOREIGN PATENT DOCUMENTS 3323176  1/1965  Fed. Rep. of Germany ....... 98/2.08
2479106 10/1981  France ............................. 98/2.06
2128322  4/1984  United Kingdom ............... 98/2.06

Primary Examiner—Steven E. Warner
Attorney, Agent, or Firm—Lyon & Lyon

[57] ABSTRACT

A hollow cross member structure for an automobile having a cross member which is disposed laterally across the automobile so as to form a part of the dashboard of the automobile and to define a part of an air duct structure for air conditioning the passenger compartment of the automobile. This cross member structure can define an advantageous air duct structure and effectively reinforce the automobile body structure at the same time by comprising a bulkhead in a substantially laterally central position of the cross member so as to divide the interior of the cross member into a first chamber for fresh air to be air conditioned and a second chamber for fresh air to be directly introduced into a passenger compartment, with the two chambers provided with individual air inlets and outlets. A funnel member which diverges upward and is disposed inside the cross member so as to extend between an upper member and a bottom member of the cross member can provide an advantageous air duct for defrosting or demisting the windshield and, additionally, can effectively reinforce the cross member structure.

10 Claims, 2 Drawing Sheets

CROSS MEMBER STRUCTURE FOR AUTOMOBILE

This application is a continuation of application Ser. No. 867,332, filed 5/23/86 now abandoned.

TECHNICAL FIELD

The present invention relates to a hollow cross member structure for automobile which is disposed laterally across the automobile body so as to form a part of the dashboard of the automobile and to define a part of an air duct structure for air conditioning the passenger compartment of the automobile, and in particular to such a cross member structure which can define an advantageous air duct structure and effectively reinforce the automobile body structure at the same time.

BACKGROUND OF THE INVENTION

Typically, a front part of the passenger compartment of an automobile is reinforced by a cross member structure consisting of a box-like structure defined by a dashboard panel and a cowl panel having required rigidity and mechanical strength. Since a complex air duct structure is necessary in the vicinity of the dashboard of an automobile, for instance, for ram pressure ventilation or, in other words, for introducing fresh air from outside by the wind pressure produced by the motion of the automobile, defrosting or demisting the windshield by blowing warm air thereonto by a motor-driven fan, and circulating warmed or cooled air in the passenger compartment, the interference between the cross member structure provided in the forward end of the passenger compartment for reinforcement with such an air duct structure could be a problem in designing the automobile body.

It is known to define an air duct in the interior of the cross member and utilize a part of the cross member as an air duct structure for guiding air to an air conditioner or a blower for air conditioning the passenger compartment or for removing moisture from a windshield, as the case may be, but, in such a case, since a number of holes must be provided in the structure to the end of introducing fresh air into the air duct structure, diverting air to various air outlets in the passenger compartment for air conditioning and letting out air uniformly therefrom for defrosting or demisting the windshield, it will be difficult to give a desired reinforcement capability to the cross member. Particularly since the cross member is located very close to the driver, any vibration of the cross member due to lack of rigidity of the cross member, no matter whether it is caused by the air flow in the air duct structure or transmitted from the engine or other moving parts of the automobile, can severely impair the driving comfort of the automobile.

Also, depending on weather conditions, for instance when it is humid or raining, it is preferable to have both ventilation by ram pressure and defrosting action by a blower at the same time. In an air duct structure which allows introduction of fresh air for ventilation and defrosting at the same time, much air is sucked by the blower and the flow rate of the fresh air for ram pressure ventilation tends to be insufficient. It is conceivable to provide an air duct for introducing fresh air by ram pressure and another air duct for introducing fresh air to be blown onto the windshield by a blower separately from each other, but such an air duct structure necessarily tends to be complex and makes manufacturing thereof both costly and difficult. And this problem will be even more compounded by the necessity to assure sufficient reinforcement capability to the cross member.

BRIEF SUMMARY OF THE PRESENT INVENTION

In view of such problems of the prior art, a primary object of the present invention is to provide an advantageous air duct structure for automobile which can assure satisfactory ventilation and defrosting action.

Another object of the present invention is to provide a cross member structure for reinforcement of an automobile body which can serve as an excellent air duct structure for air conditioning the passenger compartment and defrosting the windshield without compromising its capability of reinforcement.

Yet another object of the present invention is to provide a cross member structure which is so rigid as to be free from vibration problems.

According to a broad concept of the present invention, such objects are accomplished by providing a cross member structure for an automobile having a hollow cross member which is disposed laterally across the automobile body so as to form a part of the dashboard of the automobile and to define a part of an air duct structure for air conditioning the passenger compartment of the automobile, comprising: a bulkhead provided substantially in laterally central position of the cross member so as to divide the interior of the cross member into a first chamber for fresh air to be air conditioned and a second chamber for fresh air to be directly introduced into a passenger compartment; the two chambers being provided with individual air inlets and outlets. Thus, the bulkhead can reinforce the cross member on one hand and define the two air chambers for favorable arrangement of the air duct structure.

According to a certain aspect of the present invention, a funnel member which diverges upward and serves as both a structural member and an air duct for defrosting or demisting the windshield is disposed inside the cross member and extends between an upper member and a bottom member of the cross member, preferably with a bulkhead bridged across a front member and a rear member of the funnel member. This funnel member will not only advantageously guide the air flow for even distribution of the defrosting air flow but also effectively reinforce the cross member structure.

According to another aspect of the present invention, the air inlets comprise at least a part of openings provided in a front member of the cross member for introducing fresh air into the two chambers, respectively, and an opening for positively supplied air for defrosting or demisting a windshield communicated with the bottom end of the funnel member and provided in the bottom member of the cross member; and the air outlets comprise a plurality of openings communicated with the top end of the funnel member and provided in the upper member of the cross member, and a pair of openings provided in the bottom member of the cross member in communication with the two chambers, respectively. Thus, the air introduced into the first chamber may be used for supplying fresh air into the passenger compartment by ram pressure and the air introduced into the second chamber may be either air conditioned or directly diverted to various channels for defrosting the windshield and air conditioning the passenger compartment.

BRIEF DESCRIPTION OF THE DRAWINGS

The present invention will now be shown and described in the following in terms of a preferred embodiment thereof with reference to the appended drawings, in which.

DETAILED DESCRIPTION OF THE PREFERRED EMBODIMENT(S)

Figure 1:
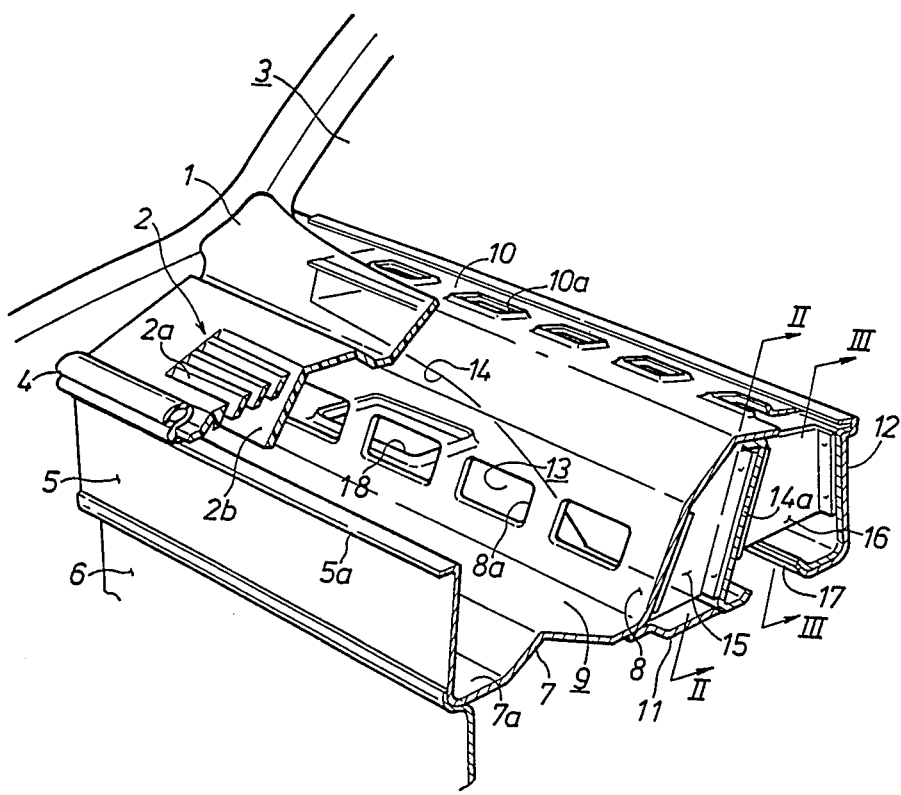
FIG. 1 is a partially broken away perspective view of a cross member structure for a passenger car according to the present invention.

FIG. 1 shows the general structure of a cross member structure located adjacent to the top end of a bulkhead which separates an engine room from a passenger compartment. A cowl top panel 1 which may be made of synthetic resin and has a plurality of air inlets 2 therein is disposed in front of a windshield 3, and a rear end of a hood not shown in the drawing covering the engine room is located over the cowl top panel 1, covering most of the cowl top panel 1. The air inlets 2 provided in the cowl top panel 1 are louvered as indicated by numeral 2a. The louvers 2a are slanted forward and the rear most louver 2b is longer than the other louvers 2a so that water entering from the air inlets 2 is guided forward and prevented from entering an air duct structure provided in the rear as is described hereinafter.

The front edge of the cowl top panel 1 is provided with a seal member 4 which engages the lower surface of the engine hood not shown in the drawings so that the heat from the engine room is prevented from entering the passenger compartment by way of the air inlets 2. A cowl front panel 5 made of steel depends from the front edge of the cowl top panel 1 at its flanged upper end 5a and divides the passenger compartment from the engine room by defining a bulkhead in cooperation with a dashboard lower panel 6.

The lower portion of the cowl front panel 5 is bent backward at the portion connected to the upper end of the dashboard lower panel 6 and defines a dashboard upper panel 7. The dashboard upper panel 7 extends backward along a slightly inclined plane, so as to collect water introduced from the air inlets 2 in a lateral trough 7a which is defined at the forward end of the dashboard upper panel 7, and the read end of the dashboard upper panel 7 is bent upward to define a baffle plate 8 which extends vertically with a slight slant towards the rear. The upper end of the baffle plate 8 is adjacent to the lower edge of the windshield 3.

Thus, an air scoop duct 9 is defined by the baffle plate 8, the dashboard upper panel 7, the cowl front panel 5 and the cowl top panel 1. The upper panel of the baffle plate 8 is bent bent backward and then extends horizontally defining a cross member upper panel 10.

The front edge of a cross member lower panel 11 is welded to the lower surface of the rear end of the dashboard upper panel 7, and the cross member lower panel 11 extends horizontally and is then bent upward to define a cross member rear panel 12. The upper end of the cross member rear panel 12 is connected to the rear end of the cross member upper panel 10 by hemming.

Thus, a ventilation duct 13 is defined by the baffle plate 8, the cross member upper panel 10, the cross member lower panel 11 and the cross member rear panel 12 which as a whole form a cross member for reinforcement of the car body. The air scoop duct 9 and the ventilation duct 13 are communicated with each other by a plurality of square openings 8a provided in the baffle plate 8.

A defroster duct 14 which is shaped as a divergent funnel is formed within the ventilation duct 13 and the lower end of the defroster duct 14 is connected to the cross member lower panel 11 while the upper end of the defroster duct 13 is covered by the cross member upper panel 10 which is provided with air outlets 10a for letting out air therefrom to blow it onto the windshield 3. The front and rear wall of the defroster duct 14 are connected to each other in middle portions thereof by a bulkhead 16, and the interior of the ventilation duct 13 is divided into a pair of chambers 13a and 13b in the middle by a bulkhead 15 connecting the baffle plate 8 and the front wall 14a of the defroster duct 14. According to the present embodiment, the rear wall of the defroster duct 14 is closely attached to the cross member rear panel 12. Otherwise, a bulkhead extending between the rear wall of the defroster duct 14 and the cross member rear panel 12 would be necessary.

The middle portion of the cross member lower panel 11 connected to the defroster duct 14 is provided with a defroster air inlet 17, and the side ends of the cross member lower panel 11 is provided with fresh air outlets 18 and 19. One of the fresh air outlets 19 and the defroster air inlet 17 are connected to a blower 21 and a heater unit 22, respectively, and the blower 21 and a heater unit 22 are connected to each other by a duct 20 while the other of the fresh air outlets 18 is connected to a ram pressure ventilation air outlet not shown in the drawings by way of another duct 23. Further another outlet of the heat unit 22 is connected to yet another duct 25 which conducts the air condition air to various air outlets in the passenger compartment. Numeral 24 denotes a pair of side panels closing the two side ends of the cross member.

Figure 2:
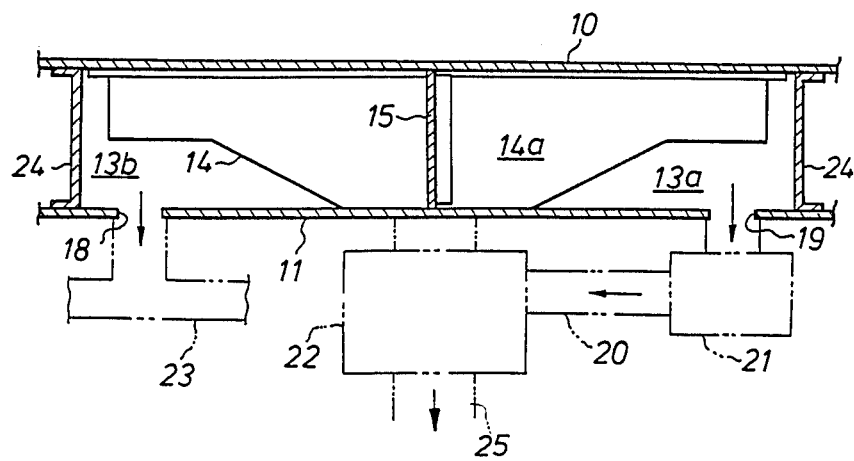
FIG. 2 is a schematic sectional view taken along line II—II of FIG. 1.
Figure 3:
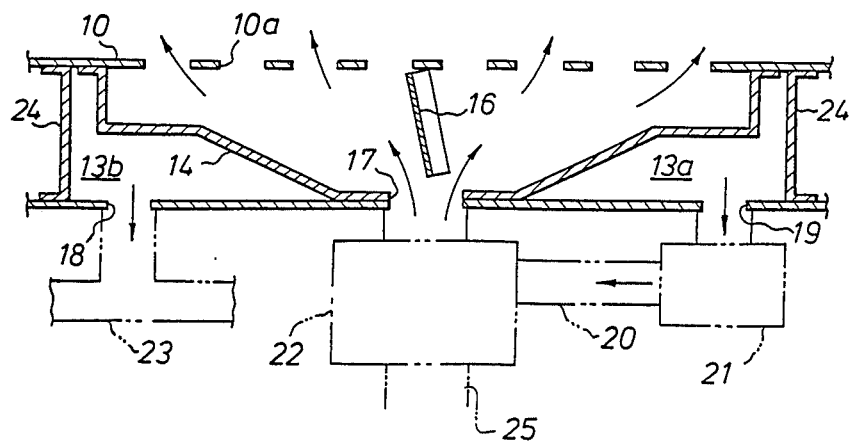
FIG. 3 is a schematic sectional view taken along line III—III of FIG. 1.

Now the flow of air in the above described structure is described in the following with reference to FIGS. 2 and 3.

The air introduced from the air inlets 2 is admitted to the two chambers 13a and 13b of the ventilation duct 13 defined in the cross member by way of the openings 8a of the baffle plate 8, and then conducted to the passenger compartment by way of the air outlets 18 and 19 provided in the lateral side ends of the ventilation duct 13. The air conducted to one of the air outlets 18 in the chamber 13b is let out from the ram pressure ventilation air outlets by way of the duct 23, by the ram pressure produced by the motion of the automobile, while the air conducted to the other of the air outlets 19 in the other chamber 13a is introduced into the blower unit 21 having a motordriven fan therein and then into the heater unit 22 in which the air is heated by the engine cooling water heated by the engine and diverted to various air outlets in the passenger compartment by appropriate dampers which are also not shown in the drawings.

However, the air to be blown onto the windshield for removing moisture therefrom or the defrost air is introduced from the heater unit 22 to the defroster duct 14 and let out from the defrost air outlets 10a provided in the cross member upper panel 10. The bulkhead 16 provided in the defroster duct 14 not only reinforces the defroster duct 14 but also serves as a vane for straightening the air flow and distributing the air flow to the right and left or for the portions of the windshield facing the driver and the passenger who may be sitting right next to him. Also, since the ventilation duct 13 is divided into the two chambers 13a and 13b by the bulkhead 15, even when the blower 21 is activated, the ram pressure air can be introduced from the air outlets 18 to the passenger compartment at a sufficient flow rate.

Thus according to the present invention the cross member of the automobile body can be conveniently utilized as part of an air duct structure without compromising the rigidity and the mechanical strength thereof, and the automobile body structure is simplified and made easier to manufacture. In particular, since a substantial reinforcement of the cross member can be accomplished by the advantageous arrangement of the duct structure, any noises arising from the air flow in the ducts and vibrations of the automobile body in general can be effectively reduced.

Although the present invention has been shown and described with reference to the preferred embodiment thereof, it should not be considered as limited thereby. Various possible modifications and alterations could be conceived of by one skilled in the art to any particular embodiment, without departing from the scope of the invention.

We claim:

1. A cross member structure for an automobile having a hollow cross member which is disposed laterally across the automobile so as to form a part of a dashboard of the automobile and to define a part of an air duct structure for air conditioning a passenger compartment of the automobile comprising:
    a bulkhead provided substantially in a laterally central portion of the air duct structure portion of the cross member so as to divide the interior of the cross member into a first chamber for fresh air to be air conditioned on one lateral side of the bulkhead and a second chamber for fresh air to be directly introduced into a passenger compartment on the other lateral side of the bulkhead; the two chambers being provided with individual air inlets and outlets.

2. A cross member structure for an automobile as defined in claim 1, further comprising a funnel member which diverges upward and is disposed inside the cross member so as to extend between an upper member and a bottom member of the cross member.

3. A cross member structure for an automobile as defined in claim 2, wherein a bulkhead is bridged across a front member and a rear member of the funnel member.

4. A cross member structure for an automobile having a hollow cross member which is disposed laterally across the automobile so as to form a part of the dashboard of an automobile and to define a part of an air duct structure for air conditioning the passenger compartment of the automobile comprising:
    a funnel member which diverges upward and serves as a structural member by being disposed inside the cross member and extending between an upper member and a bottom member of the cross member; and
    a second member for fresh air to be directly introduced into the passenger compartment, the air in the funnel member and the second member not intermixing until the air is emitted into the passenger compartment.

5. A cross member structure for an automobile as defined in claim 4, further comprising a bulkhead bridged across a front member and a rear member of the funnel member.

6. A cross member structure for an automobile having a hollow cross member which is disposed laterally across the automobile so as to form a part of a dash board of the automobile and to define a part of the air duct structure for air conditioning a passenger compartment of the automobile comprising:
    a bulkhead provided substantially in a laterally central position of the cross member so as to divide the interior of the cross member into a first chamber for fresh air to be air conditioned and a second chamber for fresh air to be directly introduced into the passenger compartment;
    a funnel member which diverges upward and is disposed inside the cross member so as to extend between an upper member and a bottom member of the cross member;
    the two chambers being provided with individual air inlets and outlets;
    the air inlets comprised of at least a pair of openings provided in a front member of the cross member for introducing fresh air into the two chambers, respectively, and an opening for positively supplied air for defrosting or demisting a windshield communicated with the bottom end of the funnel member and provided in the bottom member of the cross member; and
    the air outlets comprised of a plurality of openings communicated with the top end of the funnel member and provided in the upper member of the cross member, and a pair of openings provided in the bottom member of the cross member in communication with the two chambers, respectively.

7. The cross member structure for an automobile as defined in claim 6, wherein the air outlet for the first chamber directly opens into the passenger compartment while the air outlet for the second chamber is connected to an air conditioning unit.

8. A cross member structure for an automobile as defined in claim 7, wherein at least the air inlet for the first chamber is adapted to receive air by ram pressure produced by the motion of the automobile.

9. A cross member structure for an automobile having a hollow cross member which is disposed laterally across the automobile so as to form a part of the dash board of the automobile and to define a part of an air duct structure for air conditioning the passenger compartment of the automobile comprising:
    a funnel member which diverges upward and serves as a structural member by being disposed inside the cross member and extending between an upper member and a bottom member of the cross member;
    an opening provided in a bottom member of the cross member for admitting positively supplied air for defrosting or demisting a windshield to the bottom end of the funnel member; and
    a plurality of air outlets provided in a top member of the cross member for letting out the air for defrosting or demisting the windshield from the top end of the funnel member.

10. The cross member structure for an automobile as defined in claims 6, 7, 8 or 9, wherein a bulkhead is bridged across a front member and a rear member of the funnel member.

* * * * *